(No Model.)
J. T. SMITH.
REVOLVER.
No. 311,383. Patented Jan. 27, 1885.
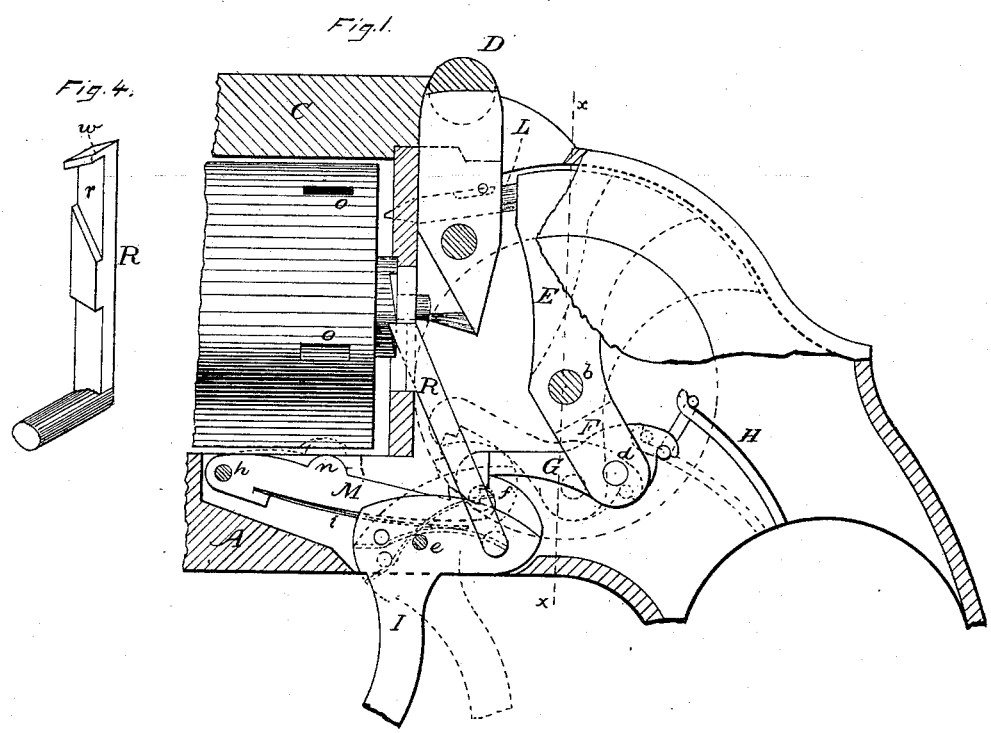
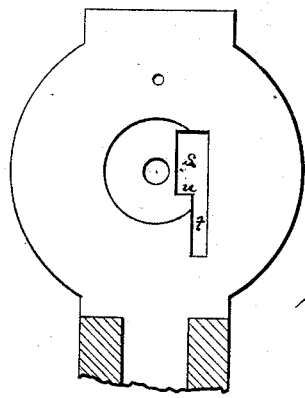
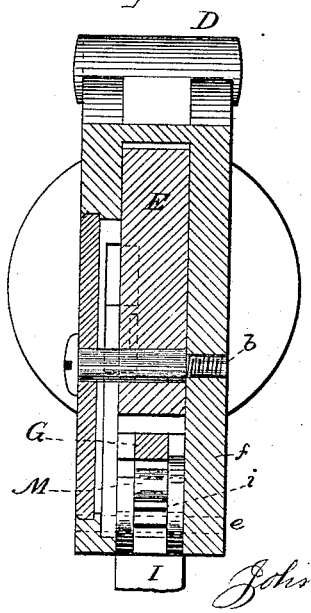
Witnesses
John T. Smith
Inventor
By Atty.

(No Model.)  2 Sheets—Sheet 2.
J. T. SMITH.
REVOLVER.
No. 311,383.  Patented Jan. 27, 1885.
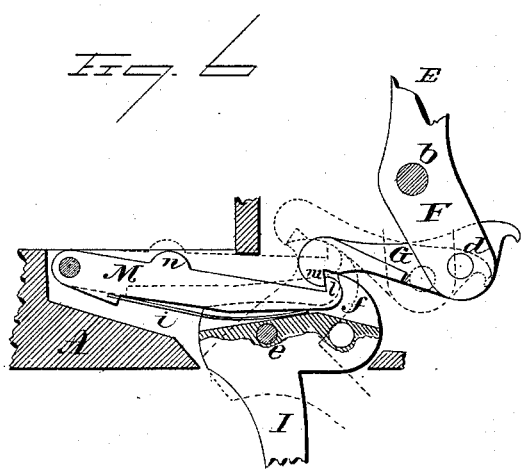

UNITED STATES PATENT OFFICE.

JOHN T. SMITH, OF ROCKFALL, CONNECTICUT.

REVOLVER.

SPECIFICATION forming part of Letters Patent No. 311,383, dated January 27, 1885.

Application filed July 18, 1884. (No model.)

*To all whom it may concern:*

Be it known that I, JOHN T. SMITH, of Rockfall, in the county of Middlesex and State of Connecticut, have invented a new Improvement in Revolvers; and I do hereby declare the following, when taken in connection with the accompanying drawings and the letters of reference marked thereon, to be a full, clear, and exact description of the same, and which said drawings constitute part of this specification, and represent, in—

Figure 1, a sectional side view; Fig. 2, a transverse section on line $x\ x$ of Fig. 1, looking forward; Fig. 3, a front view of the recoil-plate; Fig. 4, a perspective view of the pawl; Fig. 5, a perspective view of the pawl as previously constructed; Fig. 6, a sectional side view illustrating the action of the trigger, the dog G, and the lever M.

This invention relates to an improvement in that class of revolvers which are made self-cocking, the principal object being to connect the hammer entirely within the frame, whereby many of the accidents occurring from an exposed hammer will be avoided, and at the same time enable the person using the arm to know the exact position of the hammer; and the invention consists in the construction and combination of parts, as more fully hereinafter described, and whereby the object is accomplished.

In illustrating my invention I show it as applied to the revolver known as "Smith's Revolver," and in which the barrel is hinged to the frame forward of and below the cylinder, with an arm extending rearward over the cylinder to be locked to the frame in rear of the cylinder.

The barrel and hinging device, constituting no part of my present invention, are not shown in the accompanying illustrations.

A represents the principal part of the frame below the cylinder, and to which the barrel is hinged; C, the arm which extends rearward from the barrel, and secured by a latch, D, as in the said Smith's revolver.

E is the hammer, hung upon a pivot, $b$, in the usual manner; but instead of extending above the frame to form a thumb-piece, and by which the hammer may be turned, the thumb-piece is omitted and the frame closed over the hammer, as seen in Fig. 1. An arm, F, extends from the hammer below the pivot, and on a pivot, $d$, in the end of the arm the dog G is hung, one arm extending to the rear, and forming the hook with which the mainspring H engages, and so as to impart the power of the mainspring to the hammer, at the same time tending to turn the forward arm of the dog G downward. I, the trigger, which is hung in the frame below upon a pivot, $e$. It extends rearward from the pivot to form a cam-like hook, $f$, above the pivot $e$, to engage with a corresponding hook or shoulder in the forward end of the dog G, and so that by pulling the trigger the hook $f$ is thrown upward and forward, taking with it the dog G, and so as to turn the hammer backward toward the full-cock position. As it approaches the full-cock position the back or cam-like surface of the hook $f$ strikes the under side of the dog near the hook, and so that in completing such rear movement of the hammer the dog will be forced from its engagement with the hook $f$, and so as to escape therefrom, and then by the action of the mainspring be thrown forward to deliver its blow upon the firing-pin L.

In the frame beneath the cylinder a lever, M, is hung upon a pivot, $h$, which extends to the rear over the trigger. To its under side a spring, $i$, is fixed, which extends rearward and so as to take a bearing upon the top of the trigger, here shown as in a recess in the top of the trigger, (see Fig. 6,) this spring tending to throw the lever M upward. The rear end of this lever is provided with a shoulder, $l$, which forms the sear upon which the dog G may engage at half-cock, and so that if the trigger be pulled to carry the dog G forward it will first engage the notch $l$, and there stand at half-cock and away from the firing-pin, from which it can only escape by a further pull of the trigger. The spring $i$ bears upon the trigger in rear of its pivot $e$, and thereby serves as a trigger-spring, and which when the trigger is released from the pull will cause the trigger to return to its normal position, and so far removed from contact with the dog G as to substantially avoid any accident which might occur from a positive engagement between the trigger and the dog G if the lever M were not employed.

To discharge the hammer when standing at half-cock, as seen in Fig. 6, a pull upon the trigger will bring the nose of the hook $f$ into engagement with the shoulder $m$ on the dog G, turning the dog forward and the hammer rearward until such time as the nose of the hook may escape from the shoulder of the dog, as indicated in broken lines, Fig. 6. In such movement of the trigger to full-cock the lever M comes to a bearing in the frame, as indicated in broken lines, Fig. 6, so that the lever will there rest.

The trigger is constructed with a central recess, as seen in Fig. 2, and as indicated in Fig. 6, so that as the trigger passes on to carry the hammer to full-cock and discharge it the divisions of its nose pass each side of the rear end of the lever M, leaving the nose or rear end of the lever entirely within the trigger, as indicated in broken lines, Fig. 6, and so that as the dog escapes from the nose of the trigger possible contact between the shoulder $m$ of the dog and the nose of the lever M is avoided.

Upon the upper side or back of the lever M a stop, $n$, is formed, and which, as the hammer is thrown to its full-cock position, enters a corresponding notch, $o$, at that time at the under side of the cylinder. The notches $o$ are formed in such position that when the upper chamber of the cylinder stands in line with the barrel the lower notch, $o$, will come directly over the stop $n$. The stop $n$ enters the notch $o$ as the hammer approaches its full-cock position, being forced therein by the spring $i$, and therefore holds the cylinder in that position until the hammer is released to deliver its blow. Then the dog G under the action of the mainspring forces the lever M down and the stop $n$ out of engagement with the cylinder, and so that when the hammer is down, or in the half-cock position, the cylinder may be freely turned.

In the usual construction the nose of the pawl which operates the cylinder is constructed in hook shape, as seen in Fig. 5, the hook being formed by making a recess on the front side of the pawl at its nose. It is thus made in order that the pawl may be thrown back on its descent as the nose comes in contact with the bottom of the recess through the recoil-plate. This nose is necessarily small, and in rapid working of the arm frequently breaks, and for the time being renders the arm useless. To overcome this difficulty I construct the pawl R as seen in Fig. 4. The pawl R is hung to the trigger in the usual manner, and provided with a spring, which tends to throw its nose forward, also in the usual manner. In one of its sides I form a recess, $r$, just below its end, leaving the front surface flush and straight except as to this recess. This notch reduces the thickness of the pawl below its nose. Through the recoil-plate, as seen in Fig. 3, I make the upper part, $s$, of the opening for the pawl in width little greater than the thickness of the pawl, and as in the usual construction; but the lower part, $t$, of the recess I make narrower, and so as to leave a shoulder, $u$, in one side of the recess corresponding to the recess $r$ in the pawl. As the pawl moves forward the nose rides upon the back of the recoil-plate until it reaches the shoulder $u$; then, because of the recess $r$ in the pawl, the nose falls forward through the upper part of the recess $s$ into contact with the cylinder, and then as it returns the pawl rides down upon the shoulder $u$ until the upper side or shoulder, $w$, of the recess in the pawl comes in contact with the shoulder $u$; then that shoulder $w$ rides upon the shoulder $u$ to throw the pawl away from engagement with the ratchet in the cylinder. By this construction of the pawl and of the recoil-plate I am enabled to leave the front face of the pawl flush to its extreme end, and thereby avoid the overhanging hook shape of the working end of the pawl as heretofore constructed, and consequently avoid the liability of breaking that hooked end.

I have described the mechanism of the arm as applied to a revolver having the barrel hinged forward and locked at the rear; but it will be understood that this arrangement of the barrel is not essential to the peculiar construction constituting my invention.

I claim—

1. The combination of the hammer E, hung upon a pivot within and inclosed by the frame, the dog G, hung in the hammer below its pivot, the mainspring H, engaged with one arm of said dog in rear of the hammer, the trigger I, constructed with the cam-shaped hook $f$, the forward arm of the dog G, constructed with a corresponding shoulder, with which said hook will engage to throw the hammer rearward, the lever M, hung forward of the trigger, its free end extending over the trigger, a spring, $i$, between said lever M and trigger, said lever constructed with one or more shoulders to engage a corresponding shoulder on the dog G, substantially as described.

2. The combination of the hammer E, hung upon a pivot in the frame, constructed with an arm, F, extending below its pivot, the dog G, hung in said arm F, and extending forward, constructed with a shoulder, $m$, its rear end to engage the mainspring, the lever M, hung forward beneath the cylinder and extending rearward, constructed with a shoulder, $l$, to engage the shoulder $m$ of the dog G, to hold the hammer in the half-cock position, the said lever also constructed with a stop, $n$, the cylinder constructed with notches $o$, with which said stop $n$ will engage, the trigger I, constructed with its hook-shaped nose $f$, and the spring $i$ between the lever M and trigger, substantially as described.

3. In a revolver in which the cylinder is rotated by a pawl extending from the mechanism within the arm through the recoil-plate to engage the ratchet on the cylinder, the pawl constructed with a recess, $r$, upon one side to form a shoulder, $w$, near its working end, and the recoil-plate constructed with a recess, $s$, and with a shoulder, $u$, therein corresponding to the shoulder $w$ on the pawl, substantially as and for the purpose described.

JOHN T. SMITH.

Witnesses:
V. H. COLES,
O. A. SMITH.